US007503104B2

(12) United States Patent
Rinner et al.

(10) Patent No.: US 7,503,104 B2
(45) Date of Patent: Mar. 17, 2009

(54) METHOD OF MAKING RATCHET SCREWDRIVER

(75) Inventors: James A. Rinner, Racine, WI (US); Hua Gao, Fox Point, WI (US)

(73) Assignee: Teleflex Medical Incorporated, Limerick, PA (US)

( * ) Notice: Subject to any disclaimer, the term of this patent is extended or adjusted under 35 U.S.C. 154(b) by 0 days.

(21) Appl. No.: 11/646,371

(22) Filed: Dec. 28, 2006

(65) Prior Publication Data

US 2007/0101831 A1 May 10, 2007

Related U.S. Application Data

(62) Division of application No. 11/036,577, filed on Jan. 18, 2005, now Pat. No. 7,181,997.

(51) Int. Cl.
*B23P 11/00* (2006.01)
*B25B 13/00* (2006.01)

(52) U.S. Cl. .......................................... 29/434; 81/584

(58) Field of Classification Search .................. 29/434; 81/58.4, 63.1, 60, 58; 192/43.2, 43
See application file for complete search history.

(56) References Cited

U.S. PATENT DOCUMENTS

| | | | | |
|---|---|---|---|---|
| 666,512 A | | 1/1901 | Furbish | 81/29 |
| 814,528 A | | 3/1906 | Furbish | |
| 1,704,062 A | | 3/1929 | Starkey | 81/58.4 |
| 2,300,392 A | | 11/1942 | Austin | |
| 2,664,126 A | | 12/1953 | Mansfield et al. | |
| 2,845,158 A | | 7/1958 | Morgan | |
| 3,115,913 A | | 12/1963 | Yess | |
| 3,554,251 A | | 1/1971 | McLogan | 145/75 |
| 3,908,487 A | | 9/1975 | Plaw | 81/59.1 |
| 4,488,460 A | | 12/1984 | Ballone et al. | 81/60 |
| 4,621,718 A | | 11/1986 | DeCarolis | 192/43 |
| 5,576,501 A | | 11/1996 | Huang | |
| 5,609,078 A | | 3/1997 | Yang | 81/63.1 |
| 5,848,680 A | * | 12/1998 | Rinner | 192/43.1 |
| 6,047,801 A | * | 4/2000 | Liao | 192/43.2 |
| 6,047,802 A | | 4/2000 | Huang | |
| 6,244,139 B1 | | 6/2001 | Huang | |
| 2005/0204869 A1 | | 9/2005 | Shu | 81/58.4 |

FOREIGN PATENT DOCUMENTS

| | | |
|---|---|---|
| FR | 705087 | 6/1931 |
| WO | WO 99/28091 | 6/1999 |

* cited by examiner

*Primary Examiner*—John C Hong
(74) *Attorney, Agent, or Firm*—Baker & Hostetler LLP

(57) ABSTRACT

A ratchet screwdriver and method of making same wherein there is a handle and there are a ratchet gear and pawls inside the handle. An adjuster is inside the handle and is movable by a tool extending into the handle for positioning the adjuster relative to the gear and thereby eliminating play between the gear and the handle. Ball bearings are interposed between the handle and the gear and the bearings rotatably support the gear and transmit the anti-play forces that act on the gear.

4 Claims, 4 Drawing Sheets

52
16
14
17
50
13
28
41
26
33
22
21
47
A
10
4
4
47
10
18
48
47
36

32
38
33
37
34

32
24
40

24

11
28
16
29
12
14
17
27
13
10
19
39
18
31
41
38
37
24
32
26
21
22
A
23
34
36

10
57
52
47
32
36

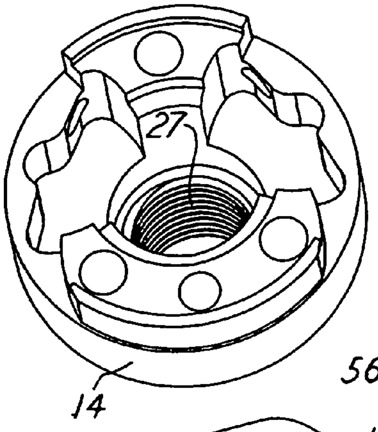
Fig.9
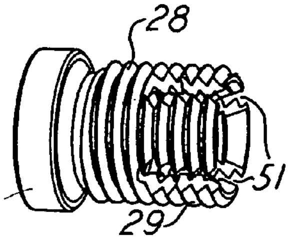
Fig.14
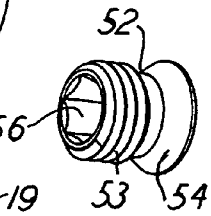
Fig.16
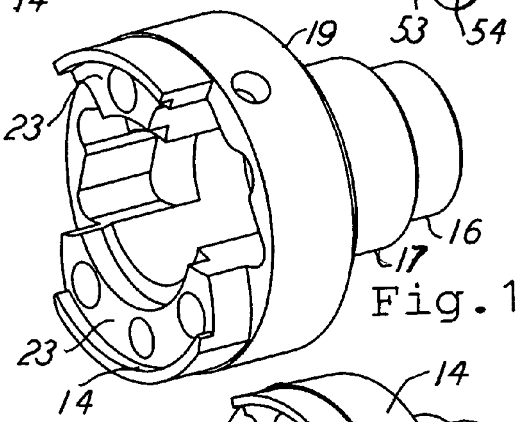
Fig.10
Fig.15
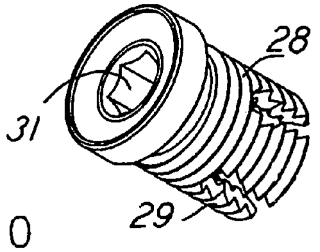
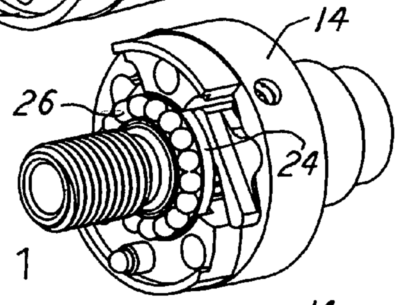
Fig.11
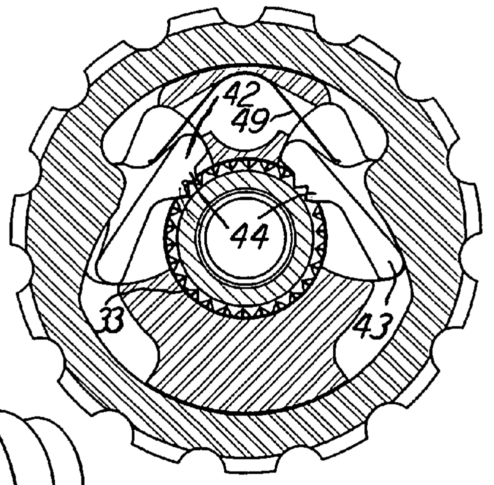
Fig.17
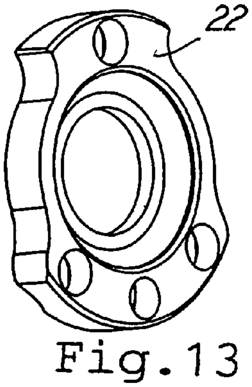
Fig.13
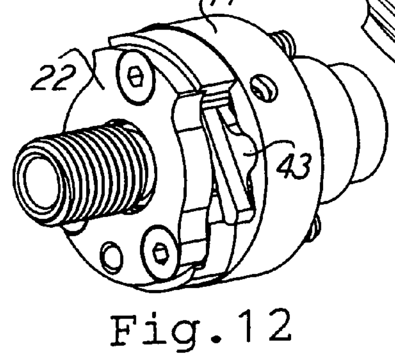
Fig.12

METHOD OF MAKING RATCHET SCREWDRIVER

CROSS-REFERENCE TO RELATED APPLICATIONS

This application claims priority to and is a divisional application of the U.S. patent application entitled, RATCHET SCREWDRIVER AND METHOD OF MAKING SAME, filed Jan. 18, 2005, having a Ser. No. 11/036,577, now U.S. Pat. No. 7,181,997. The disclosure of the above-listed patent application is hereby incorporated herein by reference in its entirety.

BACKGROUND OF THE INVENTION

Ratchet screwdrivers are well known in the prior art, and they exist in a variety of utilitarian designs. They commonly include a handle and a driven gear, and pawls are disposed intermediate the handle and gear for selective engagement of the pawl with the gear for rotation in selected directions and for ratchet action. In those arrangements, the gear can desirably rotate relative to the handle, and it is common to have clearance between the gear and the handle to accommodate the relative rotation.

The present invention provides for that desired ratchet action, and it does with a tool that eliminates the axial and radial play which are the relative movements between the gear and the handle and other tool parts. Further, the screwdriver of this invention is capable of transmitting rotation and axial forces in a firm transmission through the assembled parts of the screwdriver, and thus be devoid of play between the parts. The adjuster can then be locked in its desired adjusted position.

An adjuster is dispposed in the tool handle and is threadedly connected with the handle and is adjustable relative to the handle and from the tool exterior and thus at the completion of assembling the tool.

The aforementioned objects are accomplished with easily manufactured and assembled parts, and with a resultant screwdriver which is sturdy and firm and free of unwanted so-called shake action between the parts.

Also, this screwdriver permits cannulation action therethrough in that it accommodates the necessary parts to accomplish the aforementioned objectives while presenting a passageway through the axial length of the screwdriver. In the physical arrangement, there are ball bearings which serve the dual purposes of freedom of rotation of the gear relative to the handle and for eliminating play between the handle and the gear, both axially and radially.

Still another object is to provide a method of making a screwdriver having the aforementioned merits, and to do so in an easily assembled and facile manner and with a reliable method.

Objects, other than those expressly mentioned herein, will become apparent to those skilled in the art.

BRIEF DESCRIPTION OF THE DRAWINGS

FIGS. 9 and 10 are enlarged front perspective views of a part seen in FIG. 5.

FIGS. 11 and 12 are front perspective views of a part seen in FIG. 10, on a reduced scale, and with other parts added thereto.

FIG. 13 is an enlarged rear perspective view of a part seen in FIG. 12.

FIG. 14 is a rear perspective view of a part seen in FIG. 5.

FIG. 15 is an enlarged front perspective view of FIG. 14.

FIG. 16 is an enlarged front perspective view of a part seen in FIG. 5.

FIG. 17 is an enlarged section view showing a modification of the tool interior.

DETAILED DESCRIPTION OF A PREFERRED EMBODIMENT AND METHOD

Figures 1, 2, 3:
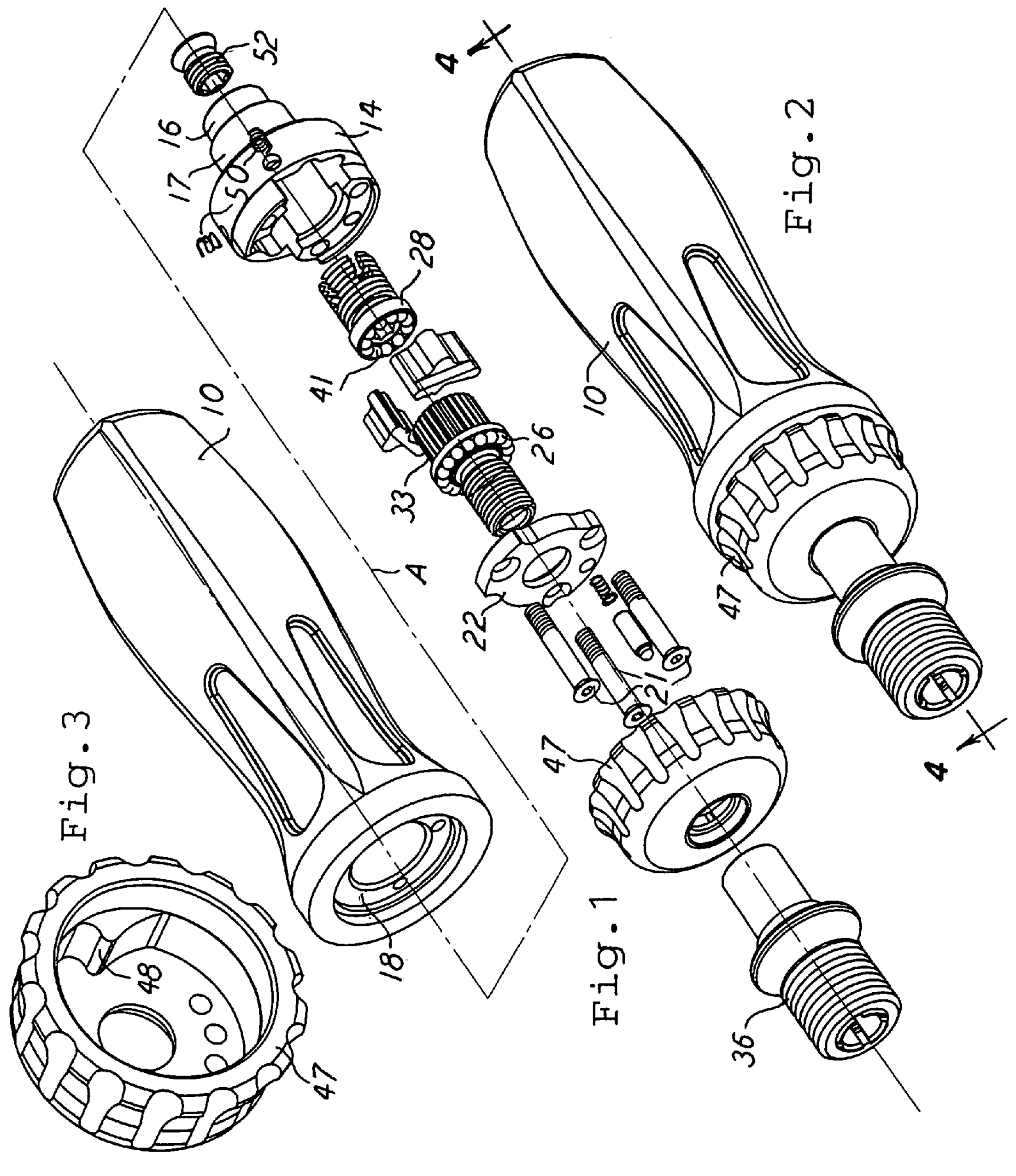
FIG. 1 is an exploded front perspective view of a preferred embodiment of the screwdriver of this invention.
FIG. 2 is a front perspective view of FIG. 1 assembled.
FIG. 3 is an enlarged perspective view of the control cap shown in FIGS. 1 and 2.
Figures 4, 5, 6, 7, 8:
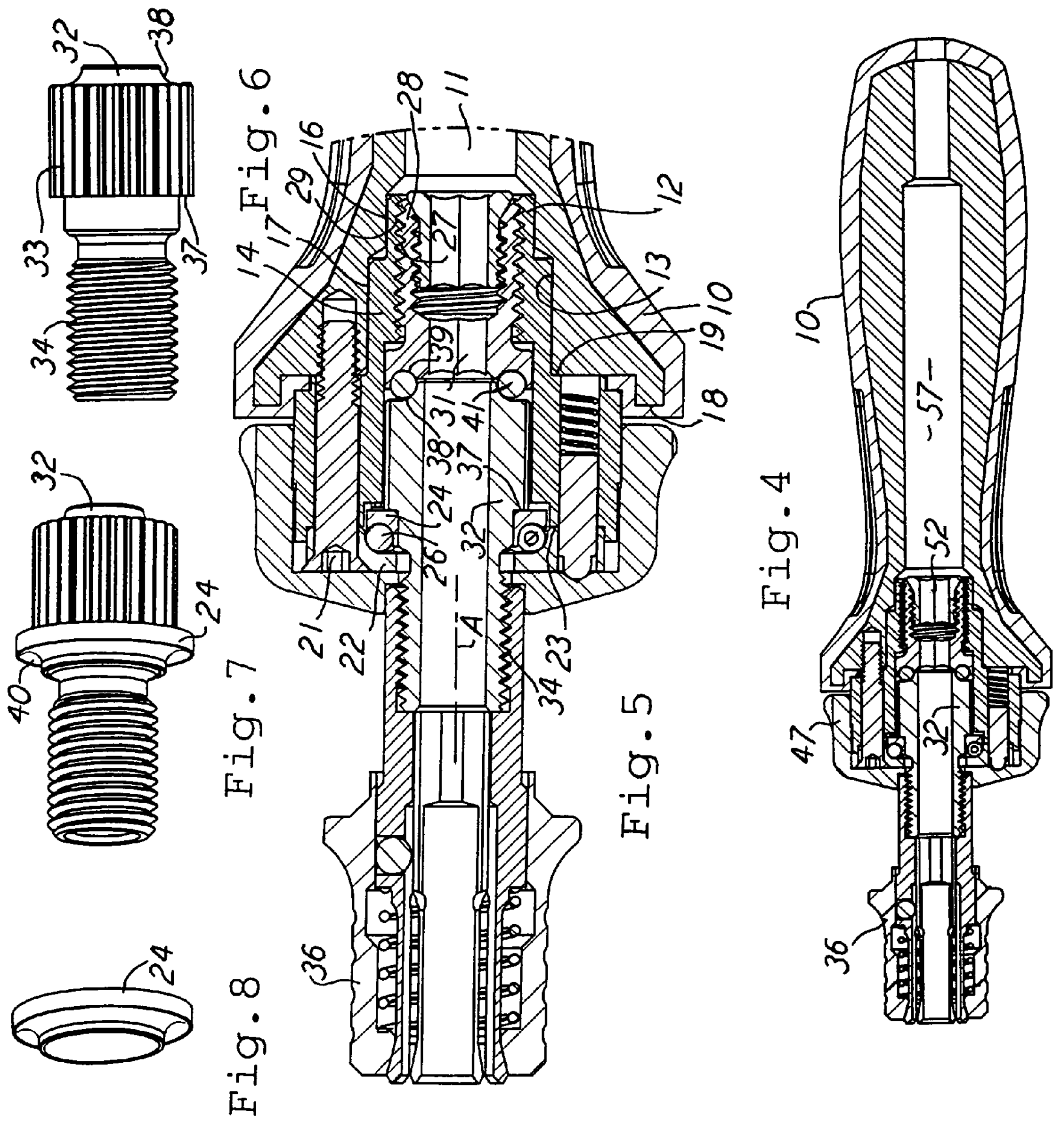
FIG. 4 is a section view taken on a plane designated by the line 4-4 in FIG. 2.
FIG. 5 is an enlarged section view of a fragment of FIG. 4.
FIG. 6 is a side elevation view of a part seen in FIG. 5.
FIG. 7 is an enlarged perspective view of FIG. 6.
FIG. 8 is a perspective view of a part seen in FIG. 7.

FIG. 1 shows the invention of the tool which is shown in the exploded display centered on the angulated line A, and the entire tool will be assembled as shown in FIG. 2. While this tool is generally referred to as a screwdriver, it is useful for drivingly rotating unshown screws, bolts, and like conventional fasteners, though unshown. There is an elongated handle 10 having the hollow interior 11 seen in FIG. 4. The interior has two relatively stepped cylindrical openings 12 and 13 as best seen in FIG. 5. A cylindrically shaped member 14 is snugly disposed in the openings 12 and 13 with matching cylindrical walls 16 and 17.

Also, the handle 10 has an end wall 18, and the member 14 has a shoulder 19 in axial abutment with the wall 18. In that telescopic assembly, the member 14 extends forwardly beyond handle 10, and those two parts 10 and 14 are centered on the tool longitudinal axis A. Three screws 21 extend through the member 14 and thread into the handle 10, as shown, to secure the member 14 to the handle. A ball bearing outer race plate 22 abuts the front face of the member 14 at the matching surfaces at 23, with the outer race plate 22 in axial facing contact at 23 with the member 14. The three screws 21 extend through the race plate 22 to hold the member 14 on the handle 10. There is an inner race plate 24, and a plurality of ball bearings 26 are disposed between the outer race plate 22 and inner race plate 24.

FIGS. 9-12 also show the member 14, and FIGS. 5 and 9 show female screw threads 27 on the member 14. Another cylindrical member 28 is disposed in the handle interior 11 and is inside the member 14 and has male screw threads 29 engaged with the threads 27. For threadedly engaging the members 14 and 28, the member 28 has an interior rectilinear tool socket 31 for receiving an unshown but conventional rotation tool to thereby rotate the member 28 inside the member 14 for threaded action therebetween and as desired. That rotation will displace the member 28 along the axis and thereby relative to the handle which is considered to include the member 14. So the member 28 is an adjuster.

A ratchet gear 32 is rotationally disposed in the handle 10 for rotation on the axis A, and the handle 10 rotates independent of the gear when in the ratchet mode. Ratchet teeth 33 are circumferentially disposed on the gear 32 which has an extension with screw threads 34 thereon. A conventional tool adapter 36 threaded engages the gear 32 and connects to an unshown standard tool bit for rotation by the handle 10. As shown with the conventional adapter 36, various tool bits can be connected for desired rotation drive, as will be understood by one skilled in this art.

The gear 32 has a circular shoulder 37 which is shown to be in axial abutment with the bearing race 24. Thus, the gear 32 is restricted in axial movement leftward relative to the handle 10, as viewed in FIG. 5.

Also, the gear 32 and the member 28 present bearing races and surfaces 38 and 39, respectively, with bearing balls 41 therebetween.

Thus, the gear 32 has two axially spaced apart terminal ends 38 and 40 at the locations of the contact by those two rows of balls 26 and 41, and that presents oblique surfaces for the terminal ends for axially and radially containing the gear while allowing easy rotation of the gear relative to the handle adjacent parts. So there are handle-supported surfaces and there are the gear surfaces, facing each other, with all those surfaces being for axial stability of the gear 32. Per FIG. 7 and herein, plate 24 is a portion of gear 32.

Figure 18:
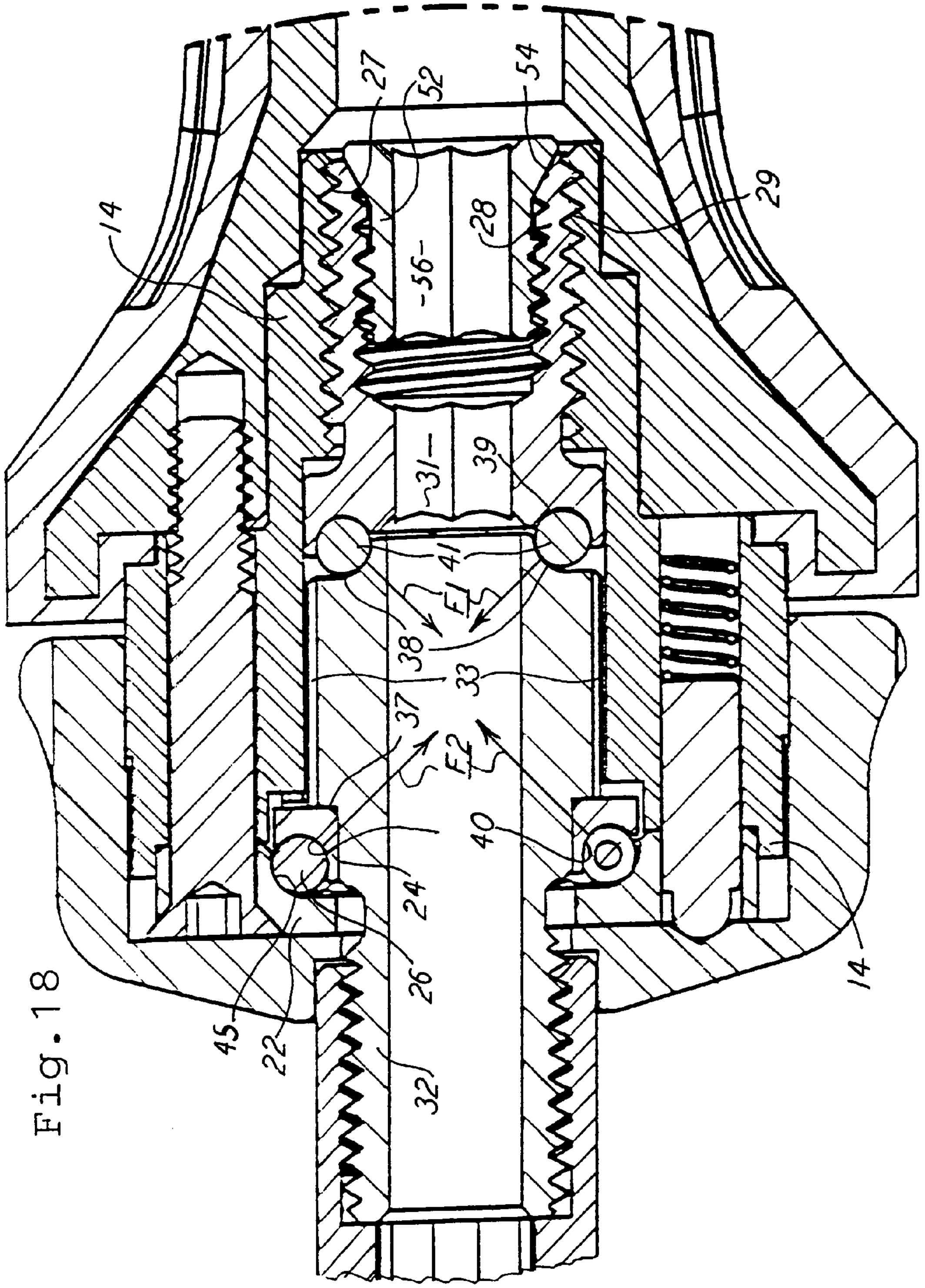
FIG. 18 is a fragment of FIG. 5, on an enlarged scale.

It will also be seen and understood that the two bearing races at each terminal axial end of the gear 32 are arcuate in the configuration which is in contact with the bearing balls, and the races are thereby oblique to the axis A, as best seen in FIG. 18. That produces both axial and radial forces F1 and F2, with F2 being a reaction force, on the gear 32 when the axial space between the races is diminished by screw tightening at threads 29. Thus any play, that is relative movement, at the gear 32 is restricted, as desired.

For ratcheting action, two pawls 42 and 43 are pivotally supported on the handle 10, such as indicated in FIG. 1 and seen in FIGS. 11, 12, and 17. The pawls 42 and 43 have teeth 44 which rotationally drivingly engage the gear teeth 33 when the pawls are pivoted to be in that engagement. A spring 49 can contact the pawls for urging the pawls into gear-engaged relationship. In FIG. 1, there can be springs 50 that urge the pawls into gear engagement, and the tool is otherwise as shown.

For selectively pivoting the pawls 42 and 43 out of gear engagement, there is a control cap 47 which is rotational on the handle 10 and is contained axially by the adapter, as seen in FIGS. 5 and 18. The control cap 47 has two protrusions on the interior, such as the shown protrusion 48 in FIG. 3, each for respective camming action with the pawls upon rotation of the control cap 47 on the handle 10. That can pivot the pawls individually and out of engagement with the gear teeth 33, and both pawls are shown engaged in FIG. 17. In that arrangement, with a clockwise rotation of the control cap 47, there will be a camming engagement by the control cap 47 with one of the pawls 42 or 43 to establish gear engagement and thereby produce a clockwise drive from the handle to the adapter. That is, tool operative drive rotation is then in the same direction as the rotation of the control cap 47.

For this invention, the pawl and control cap arrangement can be conventional and different from that shown herein, and it is the snugness of the gear that is important.

The adjuster member 28 has slits 51 extending through the screw threads 29, and that presents several radially flexible legs on the member 28. The member 28 can be threadedly tightened in the handle member 14 to thereby force against the gear 32, as mentioned. A lock plug 52 has screw threads 53 and is threaded telescoped inside the member 28 and it has a tapered end 54 to force radially outwardly on the member 28 and thereby lock the member 28 in its tight and axially set threaded position. The plug 52 has a rectilinear interior socket 56 for reception of a conventional tool to threadedly tighten the plug inside the member 28 for the secure locking mentioned.

It will also be noticed that the entire tool shown herein has an axially extending passageway 57 continuing the central opening 11 and extending entirely through the length of the handle 10 for cannulation throughout the entire tool, as best seen in FIG. 4. Thus, even the two ball bearing assemblies are torus-shaped for presenting that axial opening.

In the foregoing description and the drawings, the method of making the shown tool is also disclosed. Included in that disclosure, is the assembly of the parts, seen in FIG. 1, into the handle 10. Then the member 28 is threadedly tightened to an adjusted relationship to exert desired fore on the gear 32 through the two bearings. Then the lock plug 52, with its tapered shoulder 54, is tightened to secure the previously tightened member 28 and thus create the forces on the gear 14, as desired. That also allows for easy rotation of the gear 14 relative to the handle 10. All the tightening can be accomplished from the adapter end of the tool and through the axial opening. thus all play is removed by adjusting the bearings at final assembly, and that is both axial and radial play.

FIG. 18 depicts the forces applied by the bearings at the terminal ends of the gear 32, and those forces thus produce the axial and radial containment of the gear. The forces are oblique to the axis A, and are shown by the force arrows F1 and F2 to be at forty-five degrees relative to the axis A. The forces F1 can be applied to the gear 32 by the adjuster 28 to move the gear leftward against the bearing shown on the left, for the snug positioning thereat.

The arcuate configuration of the bearings, including the spherical balls and the ball-contacting arcuate race surfaces shown, produce those oblique forces. Of course, the left terminal end of the assembly at the gear 32 can be like the right terminal end and thereby have the bearing race 40 directly on the gear 32, as with the race 38.

One skilled in the art may recognize alterations that can be made relative to this preferred embodiment, but the scope of the invention should be determined by the claims, even if there are variations, and it is not the intention to waive the right to make the tool with variations. There is provided a tool which and be adjusted to produce axial and radial forces on the ratchet gear, and thus eliminate the play of movement of the gear relative to the handle.

What is claimed is:

1. A method of making a ratchet screwdriver, comprising the steps of:

assembling a handle;

assembling a ratchet assembly, the ratchet assembly including a ratchet gear and ratchet pawls along an axis and for ratchet action between said handle and said gear, the ratchet assembly further including an adjuster disposed in a threaded axial bore of the ratchet assembly;

inserting a plug into said adjuster and radially expanding said adjuster into screw-thread tight relationship with said handle for securing said adjuster in axially set position relative to said handle;

securing the ratchet assembly to the handle, the adjuster being disposed proximal to the handle; and rotating the adjuster to urge the adjuster against the handle, wherein relative axial movements between the handle and the ratchet assembly is reduced in response to urging the adjuster against the handle.

2. The method of making a ratchet screwdriver, as claimed in claim 1, including the step of:

placing a friction-relieving bearing in said handle to serve as said surfaces.

3. The method of making a ratchet screwdriver, as claimed in claim 1, including the step of:

placing a ball bearing in said handle to serve as said surfaces and to minimize both axial and radial movement between said handle and said adjuster.

4. The method of making a ratchet screwdriver, as claimed in claim 3, including the steps of:

providing said gear with two terminal ends and placing one said ball bearing at each said terminal end of said gear.

* * * * *